Sept. 30, 1941.    G. W. HARRIS    2,257,378
HYDRAULIC COMPRESSOR
Filed March 13, 1940
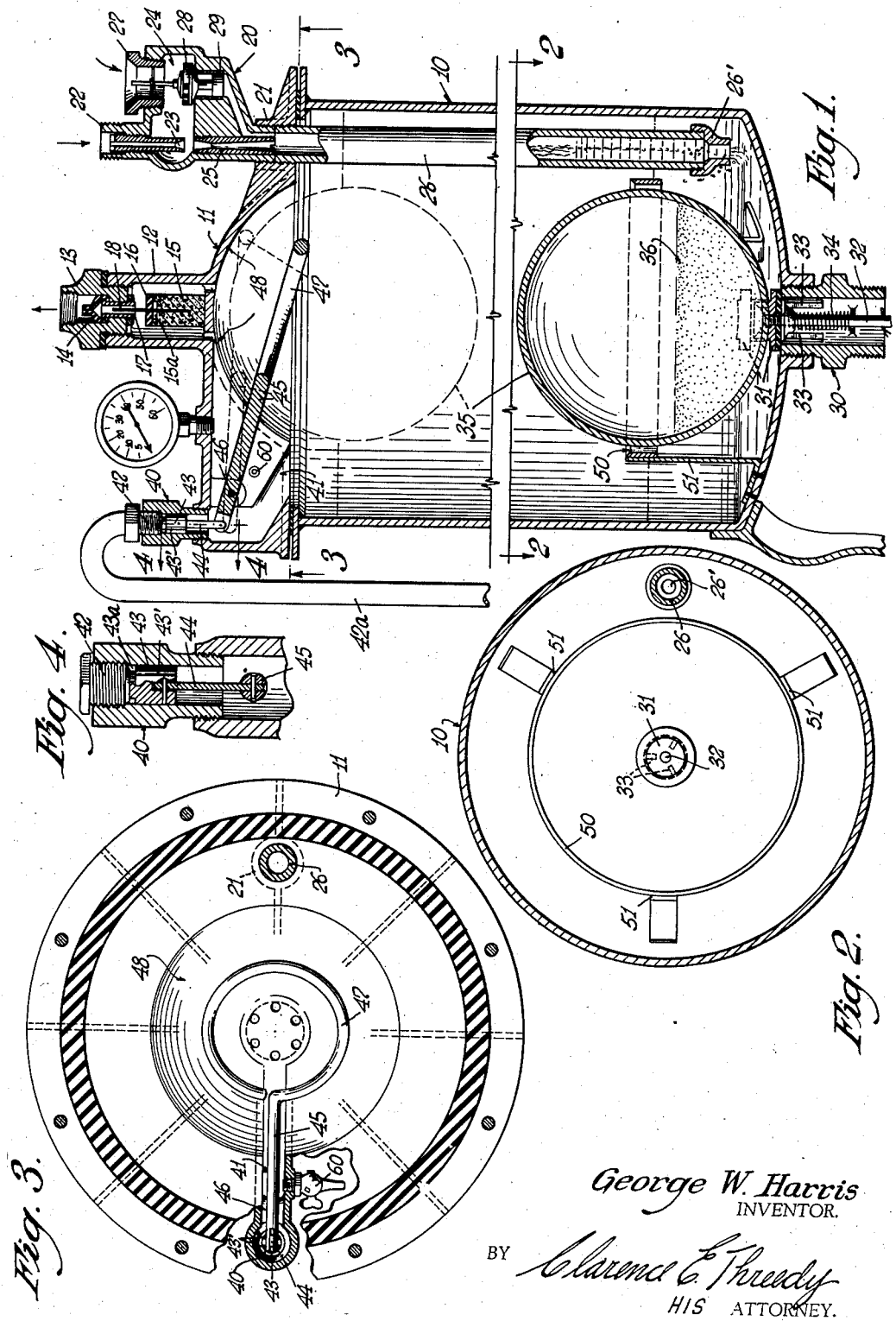
George W. Harris
INVENTOR.
BY Clarence E. Threedy
HIS ATTORNEY.

Patented Sept. 30, 1941

2,257,378

UNITED STATES PATENT OFFICE 2,257,378

HYDRAULIC COMPRESSOR

George W. Harris, Chicago, Ill.

Application March 13, 1940, Serial No. 323,655

3 Claims. (Cl. 261—121)

This invention relates to hydraulic gas compressors of the type in which a gas and liquid are injected into a tank to effect a washing of the gas as it enters the tank and a compression of the gas by an increase in the volume of the liquid, the present device preferably employing water as a compressing liquid for compressing air to be used in the dispensation of beverages, particularly beer, or other devices where washed air is to be employed.

A particular object of the invention is the arrangement in a compressing tank of an air relief valve including an operating member situated in an upper part of the tank to be engaged by a float when the liquid level reaches a certain height to spill the compressed air from the tank.

The invention further contemplates as one of its important objects the provision of a water relief valve in a lower part of the tank and means yieldably urging the valve into open condition, together with float means for closing the valve when the water level has receded a certain amount, the valve being arranged and constructed to remain in closed condition after the float has disengaged the same, provided a certain fluid pressure exists within the tank.

A further object is the provision of means for causing the float to remain in closing engagement with the water relief valve until the necessary fluid pressure has been built up in the tank to maintain the valve in closed condition as aforesaid, said valve opening when the pressure is relieved within the tank by action of the air relief valve.

Still other objects relate to the arrangement of a float confined for relatively free movement within the tank and means for causing the float to engage a seat on the air relief valve operating member notwithstanding the relatively free disposition of the float within the tank.

Yet another object is the provision of means for guiding the relatively free float positively into operative engagement with the water relief valve, notwithstanding the relatively free disposition of the float within the tank.

Other objects, advantages and novel aspects of the invention reside in certain details of construction as well as the cooperative relationship of the component parts of the illustrative embodiment described hereinafter in view of the annexed drawing, in which:

Fig. 1 is a vertical section through the compressor unit;

Fig. 2 is a horizontal section along lines 2—2 of Fig. 1 with the float removed, looking down on the water relief valve and float guiding means;

Fig. 3 is a horizontal section looking up along lines 3—3 of Fig. 1 toward the air relief valve operating means;

Fig. 4 is a vertical sectional detail through the air relief valve along lines 4—4 of Fig. 1.

The compressor unit shown in Fig. 1 includes an upstanding tank 10 provided with a removable cover section 11 having a gas discharge nozzle 12 situated centrally therein and including a coupling 13 for connection with a compression line including a storage tank. The coupling 13 preferably includes a rubber flap valve 14 permitting compressed air to move outwardly of the tank but not in the reverse direction. Situated within the member 12 is a cork float 15 provided with a flexible valve washer 16 which seats against the projecting mouth 17 of a tube in the coupling in the event that the liquid level in the tank for any reason rises beyond its normal upper limit. Float 15 is guided by a rod 18 working in the passage into the coupling 13, the float further being provided with a central recess 15a into which the washer is flexed for better sealing engagement with mouth 17, the washer being centered by rod 18.

Gas and liquid are injected into the closed tank through an injection valve 20 threaded into a boss 21 on the side of the cover section. The injection valve includes a coupling 22 for connection with a source of fluid under pressure, for example, the city water mains, and a jet nozzle 23 opening into an air injection chamber 24 to entrain air into a discharge nozzle 25 for passage through a pipe 26 into the bottom region of the tank. There is employed a restricted opening in the form of a reducer 26' at the bottom of pipe 26 which causes a mixture of the water and air that enters the tank to assure a washing of the air during its travel toward the compression head 11 by producing small bubbles.

The gas or air is aspirated through a supply opening 27 leading into the chamber 24, and there is provided in the chamber a back pressure valve 28 having a piston 29 raised by back pressure from within the tank to close off the supply opening 27 as the pressure builds up within the tank.

Means for periodically emptying the tank of its liquid contents, includes the provision of a water relief or discharge valve 30 situated in the central bottom portion of the tank and including a valve head 31 guided by a stem 32 and axially extending fingers 33 to seat as shown in Fig. 1 and close off the water discharge line which is adapted to be connected to the lower part of the valve 30. A spring 34 urges the valve element 31 into normally open condition as indicated in dotted lines in Fig. 1, the valve being closed, however, by action of a float 35 which bears down upon the valve element 31 when the water level has receded sufficiently.

Ordinarily, the efflux of water from the pipe 26 would immediately exert a lifting effort on the float 35 sufficient to permit a water relief valve constructed analogously to the valve 30, to open. However, in accordance with the present invention, the water relief valve 30 is designed, particularly with respect to the disposition and extent of the head element 31 and the action of the spring 34, so as to be maintained in closed condition when a certain fluid pressure exists within the tank, notwithstanding the fact that the float 35 may no longer be in engagement with the valve head. This is accomplished by loading the float 35 with a weight, for example, sand, 36, adequate to maintain the float in closing engagement with the water relief valve until the water level rises to the level indicated by the dash-dot line in Fig. 1, the arrangement being such that if the water level reaches this height while valve 30 remains closed, the back pressure against the valve will be adequate to maintain the same in closed condition, though the float thereafter will disengage the same and begin its upward movement.

In order to effect an opening of the water relief valve, there is provided an air relief valve, generally indicated at 40, and communicating through a passage 41 from within the upper region of the tank into a downturned discharge pipe 42a. A valve piston 43, fluted as at 43' to permit the outgoing air to move freely therepast, and working in a bore in member 40, is connected by a stem 44 with one end of a valve operating member or lever 45 pivoted as at 46 in the upper region of the tank, and normally gravitating into the position shown to seat the reduced end portion 43a of the valve piston in the mouth of a coupling nipple 42 to close off the valve passage. As shown particularly in Fig. 3, the valve operating member 45 has a float engaging seat formed at its outer end, preferably by turning back a portion 47 thereof in the form of a ring of a diameter sufficient to permit a portion of the float to seat therein.

A feature of the valve operating means or float 45 relates to the simplification achieved by having the float free and unattached within the tank, the size of the float with respect to the size of the tank being proportioned so that the float necessarily must engage the generally central parts of the air relief valve operating arm 45 and its float seating portions 47. To this end also, the cover structure 11 is provided with a concave recess 48 (Figs. 1 and 3) into which the float engaging ring portion 47 of the valve operating member, as well as the protruding portions of the sphere seated therein, may move as the float approaches the upper limit of its movement.

Means for guiding the float positively into operative engagement with the water relief valve includes the provision in the bottom of the tank of a guiding ring 50 (Figs. 1 and 2) spaced upwardly from the bottom of the tank by supporting legs 51 and of a diameter adequate to permit the float 35 to work freely into the same for movement against the head 31 of the water relief valve, it being apparent that the relative dimensioning of the ring 50, the spherical float 35, and the diameter of the tank 10, makes it inevitable that the float will work into the ring as the water level recedes.

In the operation of the device, it may be assumed that the water supply connection 22 is attached to the water mains and that the coupling 13 is connected to a compression tank, while the water discharge valve 30 is conveniently disposed with respect to a gutter or water drain. The float 35 will be in the lowered condition seen in Fig. 1, resting against the head 31 of the water relief valve and closing the latter. Meanwhile, water will be forced from the jet 23 into the pipe 25, entraining with it air from the chamber 24 through aspirator 27.

As the water level rises, a lifting effort is exerted upon the float 35, but because the latter is loaded, as by the sand 36, the float is not immediately displaced but continues to hold the water valve in closed condition. As the water level rises (the air relief valve 40 at this time being closed), the pressure within the tank increases and by the time the water reaches a certain level, approximately that of the ring 50, the lifting effort upon the float is sufficient to displace the latter and start its upward movement for ultimate engagement with the air relief valve operating arm, but the water relief valve does not open, the back pressure within the tank being sufficient by now to prevent this.

The float continues its upward movement as pressure is built up within the tank, and some of the compressed air will be passed through the valve 14 into the compression line and storage tank, the operating relationship between the compression valve 14, the working pressure within the tank, and the effort of the normal opening spring 34 of the water relief valve, being regulated so that the momentary drop in pressure within the tank as some of the compressed air escapes into the compression line, will not permit the water relief valve to open.

Ultimately the float 35 will engage in the ring portion 47 of the air relief valve operating member and pivot the latter to withdraw plunger 43 and open the air relief passage so that the residuum of compressed air within the tank will be spilled, and as soon as this occurs, the back pressure against the water relief valve is relieved and said valve opens, permitting the water to drain out at a relatively rapid rate until the float 35 is again seated against the head portion 31 of the water relief valve to close the same, whereupon the foregoing cycle of movements is repeated.

Should the water relief valve fail to open for any reason, admission of water into the compression line will be prevented by rising movement of the cork float 15 and its associated valve washer 16 which will close off the compression line. Under such abnormal conditions, it will be observed that the air relief valve will be opened and the rising column of water may escape through the downturned air pipe 42a for direction into the gutter into which the water from water relief valve 30 is ordinarily drained.

Should the float fail to open the air relief valve for any reason, thus preventing the water relief valve from opening, admission of water into the compression line will be prevented by rising movement of the cork float 15 and its associated valve washer 16 which will close off the compression line. The device will thereupon become locked by reason of the pressure within the tank being balanced with the pressure at intake 22. To relieve this condition, there is provided a hand-operated valve 60 in the cover 11, which valve when opened will release the pressure within the tank, whereupon valve 30 will be released to spill the water in the tank 10.

The various advantages and objects of the invention may be accomplished by modifications of the particular embodiments specifically described herein, and it is intended that the appended claims shall include all equivalent arrangements fairly coming within their call.

Having thus described my invention, what I claim as new and desire to protect by Letters Patent is:

1. In a compressor of the class described including a tank and means for injecting air and water therein for compression of the air by increase of the water volume, the combination of a water drainage valve in the bottom region of the tank, means yieldably urging the valve into open condition, a float carried up and down with the rise and fall of the water within the tank, said float being lowered into operative engagement with said drainage valve to close the same when the water lowers to a certain level, said drainage valve being arranged and constructed to be held closed by a certain back pressure thereagainst from within the tank, said float being constructed for displacement from closing engagement with said drainage valve only by a volume of water which corresponds to the necessary back pressure to keep said valve closed, and valve means including an operating element in the upper part of said tank and actuated by rising movement of said float to relieve pressure within the tank and permit said drainage valve to open with a consequent lowering movement of the float again into operative engagement with the drainage valve to close the same for a repeated cycle of operation.

2. In a device of the class described including a compression tank and means for injecting air and water therein for compression of air by increasing volume of water, the combination of a normally closed air relief valve communicating from the upper portion of said tank, a valve operating float freely movable within said tank with the rise and fall of water therein, and an operating member for said relief valve and including a seating portion engaged by said float in upward movement thereof for movement of the operating member to open said valve, said float and said tank being dimensioned with respect to the seating portion of said valve operating member so that the float will be guided into positive operative engagement with said operating member notwithstanding the freedom of movement of the float within the tank.

3. In a device of the class described including a compression tank into which a liquid and a gas are introduced, a drainage valve including a member threadable into the bottom of said tank exteriorly of the latter, said member having a bore constituting a drainage passage therethrough, a valve element adapted to seat against an inner end portion of said member in alignment with said bore, a stem projecting from said valve element into the bore, means guidedly engaging said stem in said bore at a point remote from said valve element, spring means acting between said guiding means and valve element to urge the latter outwardly of the bore into valve opening position, and means including a plurality of axially extending fingers attached to said stem adjacent said valve element and each spaced with respect to the other in a direction circumferentially of the bore to guide the movements of said valve element and stem with respect to the bore.

GEORGE W. HARRIS.